March 8, 1932.　　　　　J. CAGE　　　　　1,848,315
POWER TRANSMISSION MECHANISM
Filed May 8, 1931　　　3 Sheets-Sheet 1
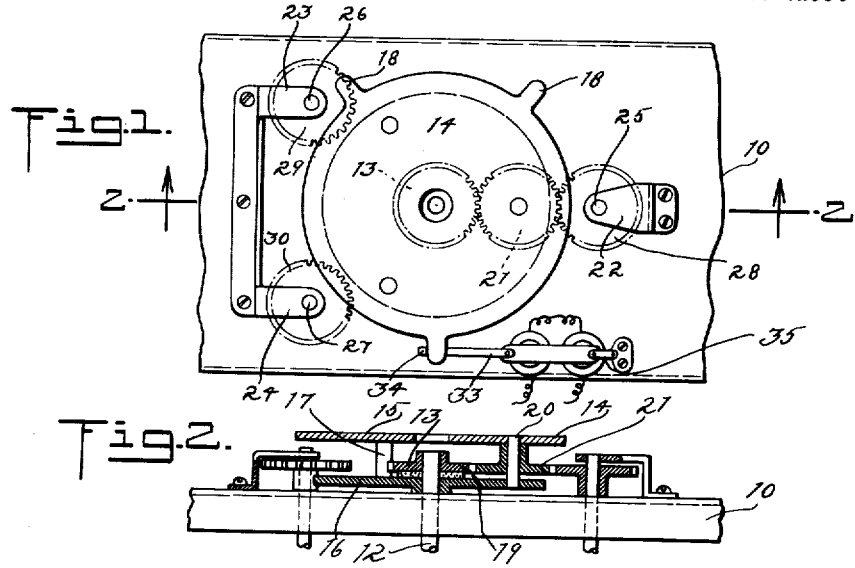
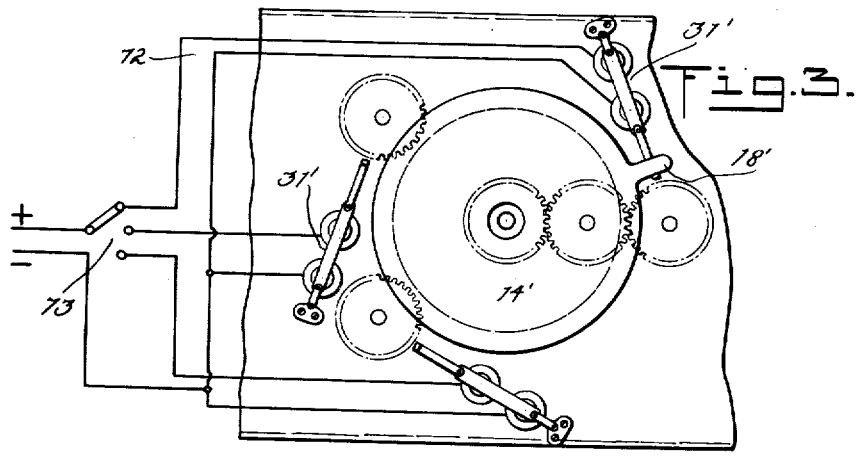
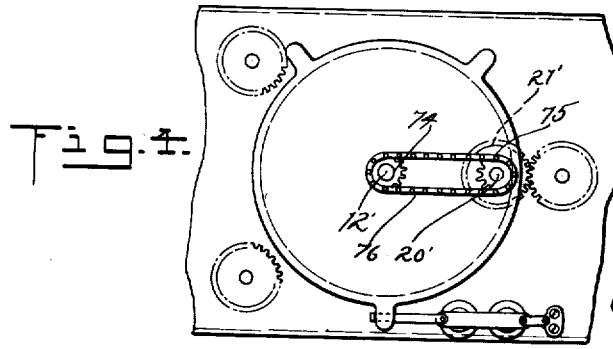
Inventor
JAMES CAGE
By Clarence A. O'Brien
Attorney March 8, 1932. J. CAGE 1,848,315
POWER TRANSMISSION MECHANISM
Filed May 8, 1931  3 Sheets-Sheet 2
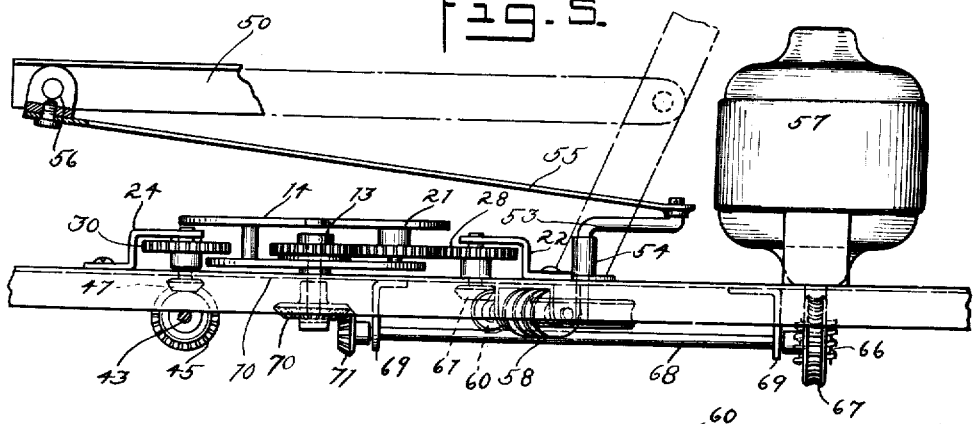
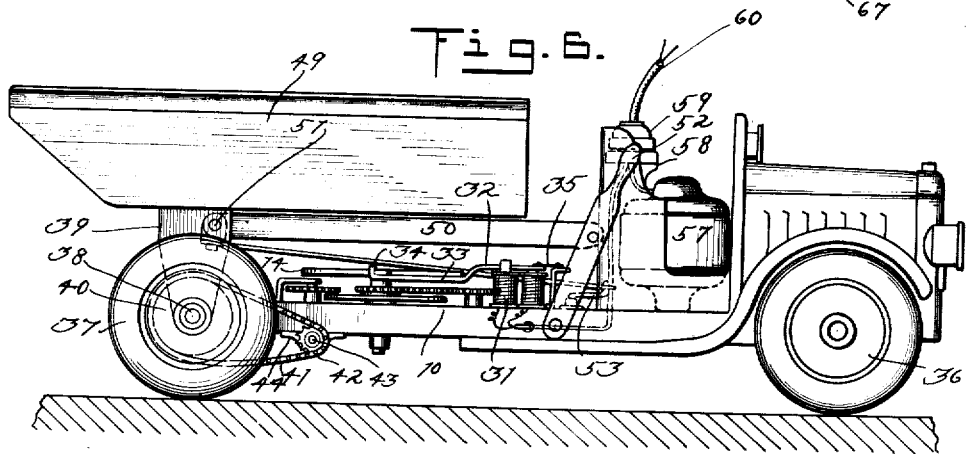
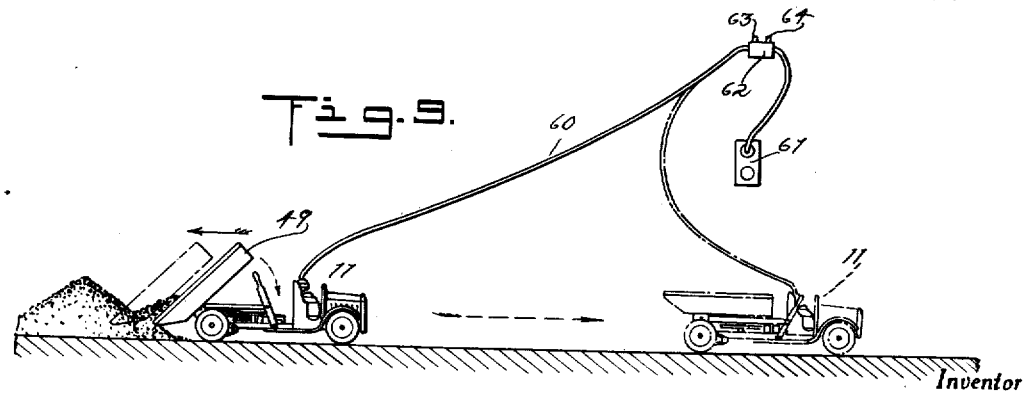
Inventor
JAMES CAGE.
By Clarence A. O'Brien
Attorney March 8, 1932.  J. CAGE  1,848,315
POWER TRANSMISSION MECHANISM
Filed May 8, 1931  3 Sheets-Sheet 3

Inventor
JAMES CAGE

By Clarence A. O'Brien
Attorney

Patented Mar. 8, 1932

1,848,315

UNITED STATES PATENT OFFICE

JAMES CAGE, OF VALLEY STREAM, NEW YORK

POWER TRANSMISSION MECHANISM

Application filed May 8, 1931. Serial No. 536,065.

This invention relates to improvements in power transmissions, and more particularly to a selective mechanism for transmitting power from a common drive element to any one of a plurality of elements to be driven, and which principle is embodied in a construction set forth in my co-pending application Serial No. 511,378, filed January 26, 1931.

The main object of this invention is to provide a power transmission which may be remotely controlled to selectively operate any one of a plurality of mechanisms and which embodies a continuously driven gear which may be brought into driving engagement with any one of a plurality of driven gears associated with the various mechanisms to be driven.

Another object of the invention is to provide a gear transmission of the above character in which there is no clashing of the gears or noise during the movement of the driving gear into meshing engagement with the gears to be driven, although the changing of the drive is rapid in its action.

A further object of the invention is the provision of a power transmission which is simple in constructon, inexpensive of manufacture, and positive in operation.

With these and other objects in view, the invention resides in certain novel constructions, combination and arrangement of parts, the essential features of which are hereinafter fully described, are particularly pointed out in the appended claims, and are illustrated in the accompanying drawings, in which:

Figure 1 is a top plan view of the preferred embodiment of my invention.

Figure 2 is a vertical longitudinal sectional view on the line 2—2 of Figure 1.

Figure 3 is a top plan view of a slight modified form of my invention.

Figure 4 is a similar view of a further modification.

Figure 5 is an enlarged detail elevational view with parts broken away in section illustrating the principle of my invention as applied to the motor driven toy truck with a raising and lowering dump body.

Figure 6 is a side elevational view of the truck embodied with the features of my invention.

Figure 9 is a side elevational view of the toy dump truck showing the same in dumping position in full lines, and normal driving position in dot and dash lines.

Figure 7:
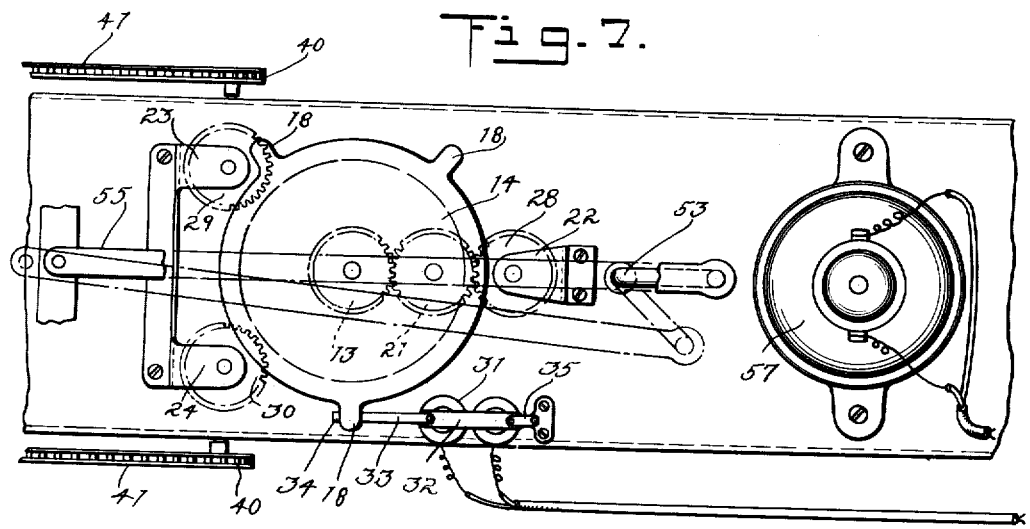
Figure 7 is an enlarged fragmentary top plan view with parts broken away.
Figure 8:
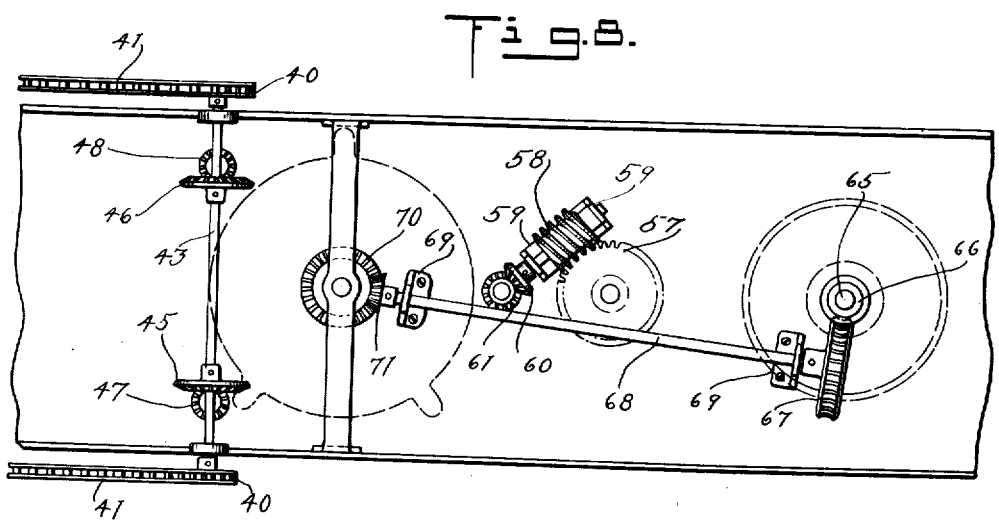
Figure 8 is a fragmentary bottom plan view.

Referring to the drawings by reference characters the numeral 10 designates a support which in the present instance constitutes the platform of a toy dump truck 11. The dump truck 11 has merely been shown in this instance to illustrate one of the uses to which my power transmission mechanism may be applied for the purpose of propelling the vehicle in a forward and reverse direction and for affecting the raising and lowering of the dump body. These operations will be more fully explained hereinafter as I wish to first explain the construction and operation of the power transmission principle.

Journaled in the support 10 and extending through opposite sides thereof is a drive shaft 12, the upper end of which has a drive gear 13 fixedly connected thereto, while freely mounted upon the said shaft 12 is a rotatable turn table 14. The turn table 14 comprises spaced upper and lower discs 15 and 16, the lower disc being rotatably mounted on the shaft 12 with gear 13 interposed between the discs 15 and 16. These discs are held in fixed spaced relation by posts 17, while extending outwardly from the peripheral edge of the upper disc 15 are spaced fingers 18. Interposed between the adjacent faces of the lower disc 16 and the drive gear 13 is a friction washer 19 which encircles the shaft 12 and provides a friction driving connection between the gear 13 and the turn table 14. Mounted upon a shaft 20 supported by the spaced plates 15 and 16 is an idler or transmission gear 21 which gear is in constant mesh with the drive gear 13 and which idler gear travels around the axis of the shaft 12 during rotation of the turn table 14 through the friction connection between the drive gear 13 and the lower plate 16 of the turn table. Journaled in the platform 10 and in bearings 22, 23, and 24 are driven shafts 25, 26 and 27, respectively, and which shafts may be operatively connected to separate mechanisms to be driven in a manner to be hereinafter explained. Fixed to the shafts 25, 26 and 27 are driven gears 28, 29, and 30, respectively, all of which are of the same diameter, and disposed on the same plane as the gears 21 and 13. The axes of the driven shafts 25, 26, 27, are arranged at an equal distance from the axis of the drive shaft 12 so that upon rotation of the turn table, the idler gear 21 will successively mesh with the driven gears arranged in spaced relation about the turn table.

From the description thus far, it will be seen that upon rotation of the drive shaft 12, the turn table 14 will rotate therewith due to the frictional drive connection between the gear 13 and the turn table and at which time the idler gear 21 rides around the drive gear 13 and over the driven gears as the said idler gear successively engages the same. No power is transmitted from the drive shaft to the driven shaft during such rotation of the turn table, but by stopping the rotation of the turn table with the idler gear 21 in mesh with any one of the driven gears power will be transmitted to any selected driven shaft, and for this purpose, I provide a selective stop and control mechanism which will now be explained.

Mounted upon the platform 10 adjacent the turn table 14 is an electromagnet 31, while pivotally supported above the cores of the magnet, is an armature 32, the free end of which supports a catch arm 33, provided with a right angular finger 34 which is adapted to be brought into the path of movement of any one of the fingers 18 extending radially from the turn table 14. A flat spring 35 connects the arm to its support and tends to normally support the armature 32 in a raised position above the cores of the electro-magnet so as to dispose the trip finger 34 in the path of the fingers 18 whereby energizing of the electro magnets will cause the downward movement of the armature which movement disconnects the trip finger 34 from any one of the stop fingers 18 at which time the turn table is free to rotate as hereinbefore mentioned. The fingers 18 are so spaced upon the turn table that the idler gear 21 may be selectively brought into operative engagement with any one of the driven gears whereby power may be transmitted from the drive shaft 12 to any one of the driven shafts 25, 26 and 27 as it is only necessary to lock the turn table against rotation with the idler gear 21 in mesh with any one of the driven gears 28, 29 and 30. This holding of the turn table against its tendency to rotate overcomes the frictional drive connection between the drive gear 13 and the turn table, whereby the power is transmitted from the drive shaft 12 through drive gear 13, idler gear 21, and any one of the drive gears with which the idler gear may be in mesh. By this construction, power may be selectively transmitted to any one of a plurality of mechanisms to be driven and an example of the utility of this drive will now be explained.

As stated hereinbefore, the principle of my transmission drive is illustrated in association with a toy dump truck 11 which includes front and rear wheels 36 and 37, the latter being fixedly mounted on a driven axle 38 journaled in bearings 39. Fixed to the axle 38 are sprocket wheels 40 over which pass sprocket chains 41, the said chains also passing around smaller sprocket wheels 42 fixed to a shaft 43 extending transversely beneath the platform 10 and journaled thereto in bearings 44. This shaft extends directly beneath the driven shafts 26 and 27 and has reversely disposed beveled gears 45 and 46 fixedly mounted thereon and which beveled gears constantly mesh with pinion gears 47 and 48 respectively. The gears 47 and 48 are fixedly connected to the lower end of the shafts 26 and 27 respectively whereby reverse rotation may be imparted to the transversely disposed shaft 43 upon meshing engagement of the idler gear 21 with the gears 29 and 30. It will therefore be appreciated that the toy dump truck may be driven either in a forward direction, or in a backing or rearwardly direction, depending upon whether the idler gear is brought into selective engagement with either of the driven gears 30 and 29.

The forward and backward driving movement of the toy vehicle constitutes two of the mechanisms to be operated by my drive principle whereas the third mechanism to be driven will now be explained. Mounted upon the bearings 39 is a dump body 49 to the under side of which a frame 50 is pivotally connected as at 51. The opposite end of the frame connects with a set of hand levers 52 pivotally connected to the sides of the platform 10. These levers 52 were utilized for manually operating the dump body 49 through the connecting frame 50, but by the use of my drive principle, this body is automatically and selectively controlled. Journaled in the platform 10 adjacent the driven gear 28 but forward thereof, is a crank shaft 53 mounted in a bearing 54, while the upper end of the crank is pivotally connected with one end of a rod or bar 55, the opposite end of the said rod or bar being pivotally connected to the frame 50 as at 56. The lower end of the crank shaft 53 extends below the platform 10 and has a gear 57 fixedly mounted thereon, and which gear is in constant mesh with a worm 58 journaled in bearings 59 provided on the under side of the platform 10. Fixed to the worm 58 is a beveled gear 60 which is in constant mesh with a beveled gear 61 fixed to the lower end of the drive shaft 25 whereby a relatively slow rotation is imparted to the gear 57 through power transmitted thereto through the beveled gears 60 and 61, and worm 58, and which power is obtained by reason of the idler gear 21 being brought into operative connection with the drive gear 28. Upon each rotation of the crank shaft 53, the dump body 49 will rise upwardly and pivot upon the axle 38 and after reaching the limit of its dumping movement, the said body will move to its lowered position as shown in Figure 6 of the drawings. However, if the intermediate or idler gear 21 is left in mesh with the driven gear 28, the body will continue to rise upwardly to dumping position and return to normal position, but this movement of the body may be interrupted by the actuation of the electromagnetic switch.

For imparting power to the drive shaft 12, I provide an electric motor 57 which is shown as mounted in the driver's compartment of the toy vehicle, although the same may be placed under the hood of the toy or anywhere else, if desired. Associated with the motor 57 is an electric socket 58 for permitting an attachment plug 59 to be inserted and which plug is carried by one end of an electric cord 60 which may be plugged into the socket of an electric fixture 61. Arranged in the cord 60 is a double acting electric switch 62 provided with push buttons 63 and 64. By actuating one of the switches, the motor may be turned on and off while the actuation of the other switch controls the electro-magnets 31. The circuits controlling this operation are not shown diagrammatically as any type of wiring may be provided to control these two circuits.

The shaft of the motor extends through the platform 10 and is designated by the numeral 65, and which carries a worm gear 66 which is in constant mesh with a gear 67 fixedly mounted upon one end of a shaft 68. The shaft 68 is journaled in bearings 69 on the underside of the platform 10 and extends rearwardly to a point adjacent the drive shaft 12. Fixed to the drive shaft 12 beneath the platform 10 is a beveled gear 70 which constantly meshes with a pinion gear 71 fixedly connected to the adjacent end of the shaft 68 whereby continuous rotation is imparted to the drive shaft 12 through the meshing beveled gears 70 and 71, shaft 68, gear 67, worm 66 from the motor 57. It will therefore be appreciated that as long as the motor is running, the shaft 12 rotates, and which motor is controlled by the actuation of one of the push buttons of the double switch 62.

From the foregoing description, it will be seen that the actions of the dump truck may be remotely controlled by an operator to cause the dump truck to move back and forth and the dumping action of the body is likewise controlled. It is only necessary for the operator to actuate one of the push buttons of the double switch 62 to actuate the electromagnetic trips in order to bring the intermediate gear 21 into operative engagement with any one of the driven gears in order to impart power to the desired mechanism.

In Figure 3 of the drawings, I have illustrated a slight modified form wherein the turn table 14' is provided with a single stop finger 18' which is engageable with any one of a plurality of electro-magnetic control devices 31', each of these devices being constructed in a manner identical to that described in the preferred embodiment of my invention. Each of the electro-magnetic devices 31' is controlled by an individual electric circuit 72, while a multiple switch 73 is connected to the circuit 72 to selectively open and close the same, whereby the actuation of the electro-magnetic devices 31' may be selectively operated to bring the turn table 14' to the desired position.

In Figure 4 of the drawings, I have shown a further modification wherein a sprocket wheel 74 is fixedly mounted upon the drive shaft 12', while a sprocket wheel 75 is fixedly mounted upon the upper end of the idler gear shaft 20'. The sprocket chain 76 passes around the sprockets 74 and 75 to impart power from the drive shaft 12' to the shaft 20' of the idler or intermediate transmission gear 21'. Aside from the driving connection between the drive shaft and the shaft of the idler gear, the construction is identical to that shown and described in the preferred embodiment of my invention.

While I have shown and described one use to which my invention may be put, it will be understood that the principle may be employed in any instance where it is desired to selectively transmit power from a single drive shaft to a plurality of shafts to be driven, and which shift of the drive from the drive shaft to any one of the driven shafts may be selectively and remotely controlled. Although I have shown what I consider to be the preferred embodiment of my invention, it will be understood that various changes in construction may be resorted to if desired, without in any way departing from the spirit of my invention, and I do not limit myself to anything less than the whole of the invention as set forth in the appended claims.

Having thus described the invention, what I claim as new and desire to secure by Letters Patent is:—

1. In a power transmission, the combination of a plurality of mechanisms to be driven mounted in fixed bearings, a rotatable carrier, a gearing wheel driving mechanism mounted on said carrier and idly movable into selective engagement with said plurality of mechanisms upon rotation of said carrier, and means for moving and holding said rotatable driving mechanism in operative driving engagement with any one of said plurality of mechanisms.

2. In a mechanism of the class described, a rotatable turn table, a plurality of gears to be driven arranged about said turn table in fixed bearings, a gear journaled in said turn table for selectively driving any one of said plurality of gears, and means for holding said turn table against rotation with said gear in meshing engagement with any one of said plurality of gears.

3. In a mechanism of the class described, a drive shaft, a drive gear fixedly mounted on said drive shaft, a turn table freely mounted on said drive shaft, an idler gear journaled in said turn table and in constant mesh with said drive gear, a plurality of driven gears journaled about said turn table and successively engageable by said idler gear upon rotation of said turn table, a frictional driving connection between said drive gear and said turn table, and means for holding said turn table stationary against the action of said friction driving connection upon rotation of said drive gear when said idler gear is in mesh with any one of said driven gears.

4. In a mechanism of the class described, a drive shaft, a drive gear fixedly mounted on said drive shaft, a turn table freely mounted on said drive shaft, an idler gear journaled in said turn table and in constant mesh with said drive gear, a plurality of driven gears journaled about said turn table and successively engageable by said idler gear upon rotation of said turn table, a frictional driving connection between said drive gear and said turn table, said frictional driving connection comprising a friction washer mounted on said drive shaft and interposed between adjacent sides of said drive gear and said turn table, and means for holding said turn table stationary against the action of said friction driving connection upon rotation of said drive gear with said idler gear in mesh with any one of said driven gears.

5. Means for transmitting power to a plurality of elements from a common driving element comprising a continuously rotatable drive shaft, a drive gear fixedly connected thereto, a turn table rotatably mounted upon the same axis as said drive shaft but rotatable with respect thereto, a transmitting gear journaled in said turn table, and in constant mesh with said drive gear and movable about the axis thereof upon rotation of said turn table, a plurality of spaced driven gears arranged about the axis of said drive shaft and in the path of movement of said transmitting gear for meshing engagement therewith, a friction driving connection between said common driving element and said turn table, to cause said turn table and said drive gear to normally rotate as a unit, and means operable for holding said turn table against the action of said friction driving connection with said transmitting gear in meshing engagement with any one of said driven gears.

6. In a mechanism of the class described, a rotatable turn table, a plurality of gears to be driven mounted in fixed bearings and arranged about said turn table, a drive gear associated with said turntable and rotatable relative thereto, means carried by and mounted on said turn table for driving connection with any one of said plurality of gears, said last named means being in constant mesh with said driven gear, releasable means for holding said turn table against rotation with the drive gear in driving relation with any one of said plurality of gears, and means connecting said drive gear and turn table in force transmitting relation so that the table will be turned when not held against rotation by said table holding means.

7. In a mechanism of the class described, a rotatable turn table, a plurality of gears to be driven mounted in fixed bearings and arranged about said turn table, a drive gear rotatably connected to said turn table for driving relation to any one of said plurality of gears, and means for holding said turn table against rotation in any one of a plurality of predetermined positions.

8. In a mechanism of the class described, a rotatable turn table, a plurality of gears to be driven mounted in fixed bearings about said turn table and at equal distance from the axis thereof, a drive gear rotatably mounted on said turn table and disposed on the same plane as said plurality of gears for driving rotation with any one of the same, and means for holding said turntable against rotation in any one of a plurality of predetermined positions.

9. In a mechanism of the class described, a rotatable member, a plurality of gears to be driven mounted in fixed bearings about said member and disposed at equal distances from the axis of rotation of said member, a drive gear rotatably mounted on said member for idle mesh with said gears upon complete rotation of said member, and means for holding said member against rotation with said drive gear in operative connection with any selected one of said plurality of gears.

10. In a power transmission mechanism, a rotatable support, a driving element rotatably mounted on said support, a plurality of mechanisms to be driven mounted in fixed bearings and arranged in the path of said driving element for selective engagement therewith, means for turning said support to cause said driving element to be brought into driving engagement with any selected mechanism to be driven, and means for holding said rotatable support against rotation when said driving element is in driving engagement with the selected mechanism to be driven.

11. In a power transmission mechanism, a rotatable unit including a rotatable driving element, a plurality of mechanisms to be driven mounted in fixed bearings and arranged about said unit at equal distances from the axis thereof, and means for selectively bringing said driving element into driving engagement with any one of said plurality of mechanisms.

In testimony whereof I affix my signatur

JAMES CAGE.

CERTIFICATE OF CORRECTION.

Patent No. 1,848,315.      Granted March 8, 1932, to

JAMES CAGE.

It is hereby certified that error appears in the printed specification of the above numbered patent requiring correction as follows: Page 4, line 83, claim 6, for the word "driven" read drive; and that the said Letters Patent should be read with this correction therein that the same may conform to the record of the case in the Patent Office.

Signed and sealed this 17th day of May, A. D. 1932.

M. J. Moore,
Acting Commissioner of Patents.

(Seal)

nism to be driven, and means for holding said rotatable support against rotation when said driving element is in driving engagement with the selected mechanism to be driven.

11. In a power transmission mechanism, a rotatable unit including a rotatable driving element, a plurality of mechanisms to be driven mounted in fixed bearings and arranged about said unit at equal distances from the axis thereof, and means for selectively bringing said driving element into driving engagement with any one of said plurality of mechanisms.

In testimony whereof I affix my signatur

JAMES CAGE.

CERTIFICATE OF CORRECTION.

Patent No. 1,848,315.            Granted March 8, 1932, to

JAMES CAGE.

It is hereby certified that error appears in the printed specification of the above numbered patent requiring correction as follows: Page 4, line 83, claim 6, for the word "driven" read drive; and that the said Letters Patent should be read with this correction therein that the same may conform to the record of the case in the Patent Office.

Signed and sealed this 17th day of May, A. D. 1932.

M. J. Moore,
Acting Commissioner of Patents.

(Seal)

CERTIFICATE OF CORRECTION.

Patent No. 1,848,315.  Granted March 8, 1932, to

JAMES CAGE.

It is hereby certified that error appears in the printed specification of the above numbered patent requiring correction as follows: Page 4, line 83, claim 6, for the word "driven" read drive; and that the said Letters Patent should be read with this correction therein that the same may conform to the record of the case in the Patent Office.

Signed and sealed this 17th day of May, A. D. 1932.

(Seal)

M. J. Moore,
Acting Commissioner of Patents.